United States Patent [19]
Von Mässenhausen

[11] 3,793,047
[45] Feb. 19, 1974

[54] PROCESS FOR IMPROVING THE SURFACE PROPERTIES OF BIOLOGICALLY FORMED CALCIUM CARBONATE BODIES

[76] Inventor: Walter H. Von Mässenhausen, Kuhbergstrasse 7, Kassel-Wilh, Germany

[22] Filed: Aug. 25, 1971

[21] Appl. No.: 175,003

[30] Foreign Application Priority Data
Mar. 18, 1971  Germany............................ 2044457
Sept. 9, 1970  Germany............................ 2113132

[52] U.S. Cl.................. 117/3, 117/100 B, 117/118, 117/123 A, 117/123 B
[51] Int. Cl.............................................. B44d 1/02
[58] Field of Search............117/3, 169 R, 118, 159, 117/123 A, 123 B, 123 D, 100 B; 423/497

[56] References Cited
UNITED STATES PATENTS
3,622,379  11/1971  Fehmerling........................ 117/118
1,602,489  10/1926  Hochstetter et al. ................ 117/3 X
2,744,030  5/1956  Toms et al. ............................ 117/3

FOREIGN PATENTS OR APPLICATIONS
626  1861  Great Britain.................. 117/123 A Primary Examiner—William D. Martin
Assistant Examiner—Dennis C. Konopacki
Attorney, Agent, or Firm—Michael S. Striker

[57] ABSTRACT

Biologically formed calcium carbonate bodies such as mother-of-pearl, natural pearls, and cultured pearls as well as products made therefrom are improved as to their surface properties by subjecting the bodies to the action of an aqueous solution containing a soluble fluoride or silicofluoride for a time sufficient to permit formation of an opalescent abrasion and acid resistant, firmly adhering surface coating consisting essentially of calcium fluoride.

7 Claims, No Drawings

PROCESS FOR IMPROVING THE SURFACE PROPERTIES OF BIOLOGICALLY FORMED CALCIUM CARBONATE BODIES

BACKGROUND OF THE INVENTION

Articles made of biologically formed calcium carbonate, such as mother-of-pearl, natural pearls, or cultured pearls, have a tendency in the course of time and during actual use to be affected by the ambient atmosphere, in particular by acid components of the air such as sulfur dioxide originating from combustion phenomena or by physiological acid action due to perspiration or decomposition of cosmetics. This results in an impairment of the calcium carbonate surface.

It is therefore an object of the present invention to provide for a protective surface coating by means of a sealing of the calcium carbonate surface.

SUMMARY OF THE INVENTION

The invention resides in the provision of an opalescent, abrasion and acid resistant, firmly adhering surface coating consisting essentially of calcium fluoride, this coating being formed on the surface of the body of a pearl, mother-of-pearl or similar article, by subjecting the body to the action of an aqueous solution containing a soluble fluoride for a time sufficient to permit formation of the said protective surface coating.

The invention also embraces a product which predominantly consists of calcium carbonate of biological origin and which is provided with a surface coating of calcium fluoride.

DESCRIPTION OF THE PREFERRED EMBODIMENTS

The calcium fluoride coating of the invention not only effects a protection of the underlying surface but also increases the abrasion resistance and improves the luster of the product.

Preferably, the calcium fluoride coating is formed by means of an aqueous solution of an alkali fluoride, such as potassium or sodium fluoride, or of ammonium fluoride.

The coating can also be formed by the action of an aqueous fluosilicic acid ($H_2SiF_6$) which may be used in admixture with salts thereof, particularly with magnesium and/or ammonium silico fluoride. The silico fluorides can also be used as such.

Preferably, aqueous solutions are used containing between 0.3 and 10 percent by weight of fluorine in the form of a fluoride, silico fluoride, or fluosilicic acid. A preferred aqueous solution contains between 2 and 6 percent by weight total amount of $H_2SiF_6$ of which one to two thirds may be present as magnesium silico fluoride ($MgSiF_6$), five-twelfths to three-twelfths as ammonium silico fluoride ($NH_4)_2 SiF_6$, and between one-fourth and one-twelfth as free $H_2SiF_6$.

Preferably the aqueous solution is used at a pH between 2 and 5. The reaction time preferably is between 20 seconds and 2 minutes. The temperature may be between 20° and 50°C and preferably is room temperature.

Special decorative effects may be obtained by varying the pH of the impregnating solution between a pH of 2 on the one hand and a pH of 5 on the other hand. If desired, portions of the surface may be shielded during the treatment.

In case of mother-of-pearl, it is advantageous to subject the product to a preliminary treatment whereby the nitrogen fraction in the albumin in the mother-of-pearl is condensed by means of an aldehyde, particularly formaldehyde.

An aftertreatment may also be useful by means of lacquers which, if desired, may be mixed with pigments.

The following examples will further illustrate the invention:

EXAMPLE 1

Two simlar Far East cultured pearls which both has a slightly yellowish tinge were subjected to two types of treatment.

The first pearl was shaken for 30 seconds in a saturated aqueous potassium fluoride solution at a temperature of 30°C (concentration about 1 percent by weight).

The yellowish tinge turned slightly to a silvery hue. The luster at the same time became more pronounced. The pearl was then washed and once, for 1 minute, exposed to a 5 percent acetic acid which was at room temperature, whereupon the pearl was then exposed for 3 minutes to the same acetic acid at a 45°C temperature. There was no discharge of carbonic acid decomposition products and no impairment of the surface quality.

A second cultured pearl of the same type which had not been treated according to the invention was subjected to the same tests with acetic acid. After 10 seconds the impairment of the surface set in visibly, as evidenced by the formation of carbon dioxide gas bubbles. At 45°C the gas generation became stronger. This pearl, after rinsing and drying, was clearly spotty.

EXAMPLE 2

A mussel originating in the Baltic Sea which had a opalescing interior was pretreated with a 20 percent formaldehyde and 1 percent hydrogen peroxide aqueous solution for 10 minutes at a temperature of 40°C. It was then washed and carefully dried. One half of it was then covered with a polychloroprene lacquer.

The subsequent surface treatment affected only the portion which was not shielded by the lacquer. It was carried out by subjecting the mussel for 30 seconds to an aqueous solution containing a total of 6 wt.-% of fluosilicic acid at a pH of 3. The treatment was carried out at room temperature. One fourth of the acid was present as free $H_2SiF_6$ and another fourth as $(NH_4)_2 SiF_6$. The other half was present as $MgSiF_6$. The silvery luster increased during the treatment. At the end of the treatment the shield coat was removed with a varnish solvent mixture. Thus, the area of distinctly less luster was again uncovered.

The resistance test was carried out as in Example 1 with a 5% acetic acid. The surface which had been treated with the silico fluorides-silicic acid remained unaffected in these tests, while on the other hand the surface which had been covered with lacquer and had therefore not been treated released carbon dioxide and acquired an undesirable appearance.

EXAMPLE 3

The interior face of a mussel which had been pretreated as in Example 2 and of which one half the surface had been shielded was thereafter subjected alternatingly to successive treatments. The first treatment was with a highly acidic, about 6% by weight concentration of $H_2SiF_6$ of which one half was present as $MgSiF_6$. The pH of the solution was about 2.

Thereafter a solution was used which had a pH of 5 and contained only about one-twelfth of the total as free $H_2SiF_6$. This solution comprised 0.5% by weight of $H_2SiF_6$; 2.5% by weight of $SiF_6^=$ as the $(NH_4)_2$ salt and 3% by weight of $SiF_6^=$ as $MgSiF_6$.

The treatment was effected at 20°C. It was repeated twice with either solution. Since each treatment lasted 5 seconds, the total treatment time was 20 seconds.

The luster-increasing effect became noticeable in a shorter time than in Example 2. The resistance test had the same results as in the preceding examples.

The process of the invention and its various embodiments permit to make mother-of-pearl-containing products as well as cultured and natural pearls highly resistant against the action of the ambient atmosphere. In specific cases there is also accomplished an improvement in the luster of objects having an imperfect appearance.

The purely mineral bond with the calcium fluoride which is by one half to one degree higher on Mohs scale improves also the abrasion resistance.

Without further analysis, the foregoing will so fully reveal the gist of the present invention that others can by applying current knowledge readily adapt it for various applications without omitting features that, from the standpoint of prior art, fairly constitute essential features of the generic or specific aspects of this invention and, therefore, such adaptations should and are intended to be comprehended within the meaning and scope of the following claims.

What is claimed as new and desired to be protected by Letters Patent is set forth in the appended claims.

I claim:

1. A process for improving the surface characteristics of pearls and similar nacreous articles consisting essentially of calcium carbonate of biological origin and to form thereon an opalescent firmly adherent coating consisting essentially of calcium fluoride that is more resistant to acids and abrasion than the original surface which comprises subjecting the said articles alternatingly to treatment with two different aqueous solutions of a mixture of fluosilicic acid and a silico fluoride, one solution having a pH of 2 and containing only fluosilicic acid and magnesium silico fluoride and the other having a pH of 5 and containing ammonium silico fluoride as well.

2. A process as defined in claim 1 in which the treatment is effected at a temperature of 20°C for a period sufficient to form an opalescent firmly adherent coating consisting essentially of calcium fluoride.

3. A process as defined in claim 1 in which the article that is subjected to treatment is a mussel shell.

4. The process of claim 1, wherein a portion of the surface of the product is shielded so as to limit the effects of the treatment to the remaining area.

5. The process of claim 1, wherein the product consists of mother-of-pearl and is subjected to a pretreatment with an aldehyde preliminarily to condense the albumin in the mother-of-pearl.

6. The process of claim 5, wherein the aldehyde is formaldehyde.

7. A process as defined in claim 1 in which the article that is subjected to treatment is a natural or cultured pearl or consists essentially of mother-of-pearl.

* * * * *